United States Patent
Mine et al.

(10) Patent No.: US 9,637,623 B2
(45) Date of Patent: May 2, 2017

(54) RUBBER COMPOSITION, SHEET CONVEYING ROLLER, AND IMAGE FORMING APPARATUS

(71) Applicant: SUMITOMO RUBBER INDUSTRIES, LTD., Kobe-shi, Hyogo (JP)

(72) Inventors: Akihiro Mine, Kobe (JP); Toshihiro Tamura, Kobe (JP); Takehiko Hyodo, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/202,692

(22) Filed: Mar. 10, 2014

(65) Prior Publication Data

US 2014/0296049 A1   Oct. 2, 2014

(30) Foreign Application Priority Data

Mar. 29, 2013  (JP) .................... 2013-073094

(51) Int. Cl.
  *C08L 19/00*  (2006.01)
  *G03G 15/00*  (2006.01)

(52) U.S. Cl.
  CPC .......... *C08L 19/00* (2013.01); *G03G 15/6511* (2013.01); *G03G 15/6529* (2013.01); *G03G 15/6552* (2013.01); *G03G 2215/00683* (2013.01)

(58) Field of Classification Search
  CPC ... B65H 27/00; B65H 2401/113; F16C 13/00; G03G 15/6511; G03G 15/6529; G03G 15/6552; G03G 2215/00683; C08L 19/006; C08L 19/00
  USPC ....................................................... 492/56, 59
  See application file for complete search history.

(56) References Cited

U.S. PATENT DOCUMENTS

| | | | | |
|---|---|---|---|---|
| 3,884,993 | A | * | 5/1975 | Gros .............................. 525/211 |
| 4,083,092 | A | * | 4/1978 | Imperial .............. G03G 15/206 492/56 |
| 5,162,441 | A | * | 11/1992 | Nakata ..................... C08L 23/16 525/193 |
| 5,242,971 | A | * | 9/1993 | Nakahama et al. .......... 524/526 |
| 5,449,713 | A | * | 9/1995 | Nakahama .............. C08L 23/04 524/491 |
| 5,698,639 | A | * | 12/1997 | Nakahama et al. ....... 525/332.4 |

(Continued)

FOREIGN PATENT DOCUMENTS

| | | | | |
|---|---|---|---|---|
| JP | 07242779 | A | * 9/1995 | .............. C08L 23/16 |
| JP | 8-334939 | A | 12/1996 | |

(Continued)

*Primary Examiner* — Jason L Vaughan
(74) *Attorney, Agent, or Firm* — Birch, Stewart, Kolasch & Birch, LLP

(57) ABSTRACT

A rubber composition contains a higher ethylene content EPDM and a lower ethylene content EPDM as a rubber component. The proportion of the higher ethylene content EPDM is 30 to 80 mass % based on the overall amount of the rubber component. The rubber composition is less susceptible to reduction in friction coefficient μ and has a proper hardness, a smaller permanent elongation and an excellent abrasion resistance after crosslinking. Therefore, the rubber composition is suitable for a sheet conveying roller and an image forming apparatus incorporating the sheet conveying roller.

6 Claims, 1 Drawing Sheet

(56) References Cited

U.S. PATENT DOCUMENTS

| | | | |
|---|---|---|---|
| 5,710,218 A * | 1/1998 | Nakahama et al. | 525/211 |
| 6,800,691 B2 * | 10/2004 | Graf | 525/191 |
| 7,423,089 B2 * | 9/2008 | Zhao | B60C 1/0025 152/525 |
| 7,448,610 B2 * | 11/2008 | Ito | B65H 3/0638 271/109 |
| 7,728,060 B2 * | 6/2010 | Minagoshi | C08L 23/0869 399/176 |
| 8,211,000 B2 * | 7/2012 | Marui | B29C 44/50 29/895.3 |
| 8,481,155 B2 * | 7/2013 | Iwase | C08J 3/243 428/314.8 |
| 8,575,261 B2 * | 11/2013 | Zhao | B60C 1/0025 524/492 |
| 2002/0058759 A1 | 5/2002 | Oka et al. | |
| 2003/0134983 A1 * | 7/2003 | Graf | 525/232 |
| 2004/0077793 A1 * | 4/2004 | Dees | C08L 23/16 525/240 |
| 2005/0249527 A1 * | 11/2005 | Kuramoto | 399/302 |
| 2006/0106123 A1 * | 5/2006 | Hatta | C08J 9/0061 521/134 |
| 2009/0308742 A1 * | 12/2009 | Paranjape | 204/403.1 |
| 2011/0130259 A1 | 6/2011 | Ito et al. | |
| 2011/0135904 A1 * | 6/2011 | Iwase | C08J 3/243 428/220 |
| 2011/0306481 A1 * | 12/2011 | Mine | C08L 23/16 492/59 |
| 2013/0030084 A1 * | 1/2013 | Kawashima | C08L 1/14 523/448 |
| 2014/0296049 A1 * | 10/2014 | Mine et al. | 492/28 |
| 2015/0316869 A1 * | 11/2015 | Tajima | B29C 71/04 492/18 |

FOREIGN PATENT DOCUMENTS

| | | | | |
|---|---|---|---|---|
| JP | 2000-75600 A | | 3/2000 | |
| JP | 2002-80662 A | | 3/2002 | |
| JP | 2004-35695 A | | 2/2004 | |
| JP | 2004323701 A | * | 11/2004 | F16C 13/00 |
| JP | 2005061467 A | * | 3/2005 | G03G 15/00 |
| JP | 2011-116480 A | | 6/2011 | |
| JP | 2012-207087 A | | 10/2012 | |
| WO | WO 2015060062 A1 | * | 4/2015 | B65H 5/06 |

* cited by examiner

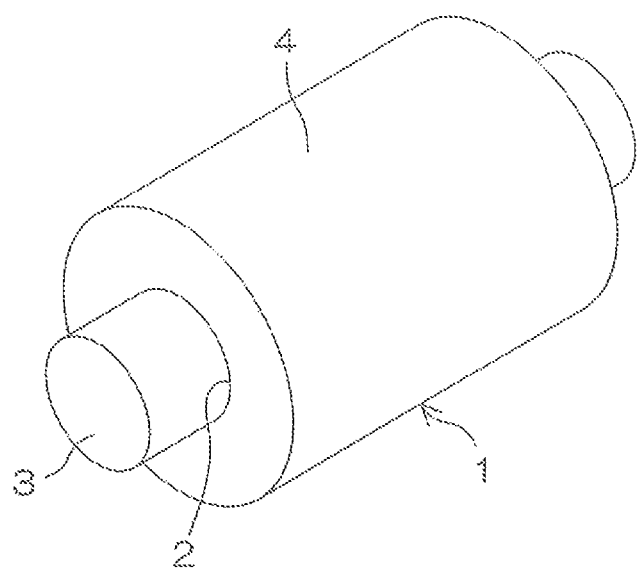

RUBBER COMPOSITION, SHEET CONVEYING ROLLER, AND IMAGE FORMING APPARATUS

TECHNICAL FIELD

The present invention relates to a rubber composition suitable for a sheet conveying roller, a sheet conveying roller formed from the rubber composition, and an image forming apparatus incorporating the sheet conveying roller.

BACKGROUND ART

Sheet conveying rollers are incorporated in a sheet conveying mechanism provided, for example, in an image forming apparatus such as an electrostatic copying machine, a laser printer, a plain paper facsimile machine or a printer-copier-facsimile multifunction machine.

Examples of the sheet conveying rollers include a sheet feed roller, a transport roller, a platen roller and a sheet output roller, which are each rotatable in contact with a sheet to frictionally transport the sheet (the term "sheet" is herein defined to include a paper sheet, a plastic film and the like, and this definition is effective in the following description).

Conventionally, various rubbers such as natural rubbers (NR), urethane rubbers, ethylene propylene diene rubbers (EPDM), polynorbornene rubbers, silicone rubbers and chlorinated polyethylene rubbers are generally used for the sheet conveying rollers. Particularly, the EPDMs are preferred, which are excellent in ozone resistance and weather resistance.

Such a sheet conveying roller is produced by forming a rubber (e.g., EPDM) into a tubular body and crosslinking the rubber of the tubular body. A shaft to be connected to a drive system for the sheet transportation is inserted in and fixed to a center through-hole of the tubular body.

The shaft, which has an outer diameter greater than the inner diameter of the through-hole of the sheet conveying roller, for example, is press-inserted into the through-hole of the sheet conveying roller, whereby a predetermined slip torque (a critical torque that prevents rotative slippage) is provided between the sheet conveying roller and the shaft by an interference defined by a diameter difference between the through-hole of the sheet conveying roller and the shaft. That is, the shaft is fixed to the sheet conveying roller so as not to rotatively slip with respect to the sheet conveying roller.

In general, sulfur is used as a crosslinking agent for crosslinking the rubber component. Where sulfur is used in combination with the EPDM, however, sulfur is liable to bloom on the outer surface of the sheet conveying roller. The blooming disadvantageously reduces the friction coefficient $\mu$ of the sheet conveying roller to cause a sheet conveying failure.

Therefore, a peroxide crosslinking agent free from the blooming is generally used for the crosslinking of the EPDM as described, for example, in Patent Literature 1. In this case, however, the sheet conveying roller has a reduced hardness.

In order to solve this problem to prevent the reduction in the hardness of the sheet conveying roller, it is conceivable to selectively use a higher ethylene content EPDM having a higher ethylene content as the EPDM. In this case, however, the sheet conveying roller has a greater permanent elongation, so that the inner diameter of the through-hole is increased with time. With a significant increase in the inner diameter of the through-hole, the slip torque is more liable to be reduced, resulting in the rotative slippage.

For the prevention of the reduction in the hardness of the sheet conveying roller, it is also conceivable to use a lower ethylene content EPDM having a lower ethylene content and capable of reducing the permanent elongation of the sheet conveying roller, and to blend a greater amount of a filler such as carbon having functions of reducing the permanent elongation of the sheet conveying roller and preventing the reduction in the hardness of the sheet conveying roller.

In this case, however, the blending of the greater amount of the filler disadvantageously reduces the abrasion resistance of the sheet conveying roller.

In Patent Literature 2, it is stated that a sheet conveying roller is produced by crosslinking a rubber component containing predetermined proportions of an isoprene rubber (IR) and a styrene butadiene rubber (SBR) in addition of the EPDM with a peroxide crosslinking agent.

An oil-extension type EPDM containing a higher ethylene content EPDM extended with an extension oil is mainly used as the EPDM. In Examples described in Patent Literature 2, a paraffin oil is blended with the EPDM.

The arrangement described in Patent Literature 2 is disadvantageous in that the hardness of the sheet conveying roller is reduced. Further, the extension oil and the paraffin oil are liable to bleed on the outer surface of the sheet conveying roller. The bleeding disadvantageously reduces the friction coefficient $\mu$ to cause a sheet conveying failure.

PRIOR ART LITERATURE

Patent Literature

Patent Literature 1: JP-HEI8 (1996)-334939A
Patent Literature 2: JP2011-116480A

SUMMARY OF INVENTION

Problems to be Solved by the Invention

It is an object of the present invention to provide a rubber composition which is less susceptible to reduction in friction coefficient $\mu$ and has a proper hardness, a smaller permanent elongation and an excellent abrasion resistance after crosslinking, and to provide a sheet conveying roller formed from the rubber composition and an image forming apparatus incorporating the sheet conveying roller.

Solution to Problem

According to an inventive aspect, there is provided a rubber composition, which comprises a rubber component and a peroxide crosslinking agent, wherein the rubber component comprises:
(1) an ethylene propylene diene rubber having an ethylene content of not less than 62%; and
(2) an ethylene propylene diene rubber having an ethylene content of not greater than 55%,
wherein the ethylene propylene diene rubber (1) is present in a proportion of not less than 30 mass % and not greater than 80 mass % based on the overall amount of the rubber component.

According to another inventive aspect, there is provided a sheet conveying roller formed from the rubber composition.

According to further another inventive aspect, there is provided an image forming apparatus incorporating the sheet conveying roller.

According to the present invention, predetermined proportions of the higher ethylene content EPDM (1) and the lower ethylene content EPDM (2) are used in combination as the rubber component, whereby the rubber composition can exhibit excellent characteristic properties of these two types of EPDMs.

That is, the blending of the predetermined proportion of the higher ethylene content EPDM can prevent the reduction in the hardness of the sheet conveying roller without the reduction in the abrasion resistance of the sheet conveying roller which may otherwise be caused by the blending of a greater amount of the filler. In addition, the combinational use of the higher ethylene content EPDM and the lower ethylene content EPDM makes it possible to reduce the permanent elongation of the sheet conveying roller to suppress the reduction in slip torque. In addition, the peroxide crosslinking system is free from the blooming, thereby preventing the reduction in friction coefficient μ.

In the present invention, the proportion of the higher ethylene content EPDM is limited to the range of not less than 30 mass % and not greater than 80 mass % based on the overall amount of the rubber component for the following reasons.

If the proportion of the higher ethylene content EPDM is less than the aforementioned range, it will be impossible to provide the effect of preventing the reduction in the hardness of the sheet conveying roller by the blending of the higher ethylene content EPDM without the reduction in abrasion resistance which may otherwise be caused by the blending of a greater amount of the filler.

If the proportion of the higher ethylene content EPDM is greater than the aforementioned range, the proportion of the lower ethylene content EPDM is relatively reduced, making it impossible to provide the effect of reducing the permanent elongation of the sheet conveying roller to suppress the reduction in slip torque by the blending of the lower ethylene content EPDM.

Where the proportion of the higher ethylene content EPDM is within the aforementioned range, on the other hand, it is possible to prevent the reduction in the hardness of the sheet conveying roller and to reduce the permanent elongation of the sheet conveying roller to suppress the reduction in slip torque without the reduction in abrasion resistance due to the blending of a greater amount of the filler in the peroxide crosslinking system free from the reduction in friction coefficient μ due to the blooming.

The inventive rubber composition preferably further comprises a crosslinking assisting agent.

This further improves the effect of suppressing the time-related increase in the inner diameter of the through-hole of the sheet conveying roller formed from the rubber composition to suppress the reduction in slip torque attributable to the increase in the inner diameter of the through-hole. This also improves the hardness of the sheet conveying roller.

Further, the inventive rubber composition preferably provides a crosslinked product having a permanent elongation of not greater than 12%.

This further improves the effect of suppressing the time-related increase in the inner diameter of the through-hole of the sheet conveying roller formed from the rubber composition to suppress the reduction in slip torque attributable to the increase in the inner diameter of the through-hole.

Effects of Invention

The present invention provides a rubber composition which is less susceptible to the reduction in friction coefficient μ and has a proper hardness, a smaller permanent elongation and an excellent abrasion resistance after crosslinking, and provides a sheet conveying roller formed from the rubber composition and an image forming apparatus incorporating the sheet conveying roller.

BRIEF DESCRIPTION OF DRAWING

The FIGURE is a perspective view illustrating an exemplary sheet conveying roller according to one embodiment of the present invention.

DESCRIPTION OF EMBODIMENTS

<<Rubber Composition>>

The inventive rubber composition contains a rubber component and a peroxide crosslinking agent. The rubber component contains at least: (1) an ethylene propylene diene rubber having an ethylene content of not less than 62%; and (2) an ethylene propylene diene rubber having an ethylene content of not greater than 55%. The ethylene propylene diene rubber (1) is present in a proportion of not less than 30 mass % and not greater than 80 mass % based on the overall amount of the rubber component.

<Higher Ethylene Content EPDM>

Usable examples of the higher ethylene content EPDM include various copolymers prepared by copolymerizing ethylene, propylene and a diene and having an ethylene content of not less than 62%. Examples of the diene include ethylidenenorbornene (ENB) and dicyclopentadiene (DCPD).

For further improvement of the effects of the present invention, the ethylene content of the higher ethylene content EPDM is preferably not less than 65%.

The upper limit of the ethylene content is not particularly defined, but is preferably not greater than 80%. If the ethylene content is greater than this range, the EPDM is liable to have a higher crystallization degree like a resin and, therefore, may be difficult to knead.

An oil-extension type EPDM extended with an extension oil or a non-oil-extension type EPDM not extended with an extension oil may be used as the higher ethylene content EPDM. In order to prevent the reduction in friction coefficient μ due to the bleeding of the extension oil, the higher ethylene content EPDM is preferably of the non-oil-extension type.

Specific examples of the higher ethylene content EPDM of the non-oil-extension type include, but not by way of limitation, ESPRENE (registered trade name) 301 (having an ethylene content of 62% and a diene content of 3.0%), ESPRENE 512F (having an ethylene content of 65% and a diene content of 4.0%) and ESPRENE 586 (having an ethylene content of 66% and a diene content of 12.5%) available from Sumitomo Chemical Co., Ltd., and NORDEL (registered trade name) IP3720P (having an ethylene content of 70% and a diene content of 0.6%), NORDEL IP3722P (having an ethylene content of 71% and a diene content of 0.5%), NORDEL IP3745P (having an ethylene content of 70% and a diene content of 0.5%), NORDEL IP3760P (having an ethylene content of 67% and a diene content of 2.2%), NORDEL IP4725P (having an ethylene content of 70% and a diene content of 4.9%), NORDEL IP4760P (having an ethylene content of 67% and a diene content of 4.9%), NORDEL IP4770R (having an ethylene content of 70% and a diene content of 4.9%), NORDEL IP4770P (having an ethylene content of 70% and a diene content of 4.9%), NORDEL IP4785HM (having an ethylene content of 68% and a diene content of 4.9%) and NORDEL IP4820P (having an ethylene content of 85% and a diene content of 4.9%) available from the Dow Chemical Company, which may be used either alone or in combination.

The proportion of the higher ethylene content EPDM should be not less than 30 mass % and not greater than 80 mass % based on the overall amount of the rubber component.

If the proportion of the higher ethylene content EPDM is less than the aforementioned range, it will be impossible to provide the effect of preventing the reduction in the hardness of the sheet conveying roller by the blending of the higher ethylene content EPDM without the reduction in abrasion resistance which may otherwise be caused by the blending of a greater amount of the filler.

If the proportion of the higher ethylene content EPDM is greater than the aforementioned range, the proportion of the lower ethylene content EPDM is relatively reduced, making it impossible to provide the effect of reducing the permanent elongation of the sheet conveying roller to suppress the reduction in slip torque by the blending of the lower ethylene content EPDM.

Where the proportion of the higher ethylene content EPDM is within the aforementioned range, on the other hand, it is possible to prevent the reduction in the hardness of the sheet conveying roller and to reduce the permanent elongation of the sheet conveying roller to suppress the reduction in slip torque without the reduction in abrasion resistance due to the blending of a greater amount of the filler in the peroxide crosslinking system free from the reduction in friction coefficient μ due to the blooming.

For further improvement of the effects, the proportion of the higher ethylene content EPDM is preferably not less than 40 mass % and not greater than 70 mass % in the aforementioned range.

<Lower Ethylene Content EPDM>

Usable examples of the lower ethylene content EPDM include various copolymers prepared by copolymerizing ethylene, propylene and a diene and having an ethylene content of not greater than 55%. Examples of the diene include ethylidenenorbornene (ENB) and dicyclopentadiene (DCPD).

For further improvement of the effects of the present invention, the ethylene content of the lower ethylene content EPDM is preferably not greater than 52%.

The lower limit of the ethylene content is not particularly defined, but is preferably not less than 40%. If the ethylene content is less than this range, the rubber composition is liable to be deteriorated in lower-temperature characteristic property.

An oil-extension type EPDM extended with an extension oil or a non-oil-extension type EPDM not extended with an extension oil may be used as the lower ethylene content EPDM. In order to prevent the reduction in friction coefficient μ due to the bleeding of the extension oil, the lower ethylene content EPDM is preferably of the non-oil-extension type.

Specific examples of the lower ethylene content EPDM of the non-oil-extension type include, but not by way of limitation, ESPRENE (registered trade name) 301A (having an ethylene content of 50% and a diene content of 5.0%), ESPRENE 501A (having an ethylene content of 52% and a diene content of 4.0%), ESPRENE 505A (having an ethylene content of 50% and a diene content of 9.5%), ESPRENE 505 (having an ethylene content of 50% and a diene content of 10.0%), ESPRENE 532 (having an ethylene content of 51% and a diene content of 3.5%), ESPRENE 552 (having an ethylene content of 55% and a diene content of 4.0%), ESPRENE 5206F (having an ethylene content of 54% and a diene content of 8.5%) and ESPRENE 5527F (having an ethylene content of 54% and a diene content of 8.5%) available from Sumitomo Chemical Co., Ltd., and NORDEL (registered trade name) IP3430 (having an ethylene content of 42% and a diene content of 0.7%), NORDEL IP3640 (having an ethylene content of 55% and a diene content of 1.8%), NORDEL IP4520 (having an ethylene content of 50% and a diene content of 4.9%), NORDEL IP4570 (having an ethylene content of 50% and a diene content of 4.9%), NORDEL IP4640 (having an ethylene content of 55% and a diene content of 4.9%) and NORDEL IP5565 (having an ethylene content of 50% and a diene content of 7.5%) available from the Dow Chemical Company, which may be used either alone or in combination.

Where the rubber component includes the two types of EPDMs, i.e., the higher ethylene content EPDM and the lower ethylene content EPDM, the proportion of the lower ethylene content EPDM is a balance obtained by subtracting the proportion of the higher ethylene content EPDM from the overall amount of the rubber component.

Where the rubber component includes three or more types of EPDMs, i.e., the higher ethylene content EPDM, the lower ethylene content EPDM and other rubber, as will be described later, the proportion of the lower ethylene content EPDM is basically a balance obtained by subtracting the proportion of the higher ethylene content EPDM and the proportion of the other rubber from the overall amount of the rubber component and, particularly preferably, not less than 20 mass % based on the overall amount of the rubber component.

If the proportion of the lower ethylene content EPDM is less than the aforementioned range in the rubber component including the three or more types of rubbers, it will be impossible to sufficiently provide the effect of reducing the permanent elongation of the sheet conveying roller to suppress the reduction in slip toque by the blending of the lower ethylene content EPDM.

<Other Rubber for Rubber Component>

An EPDM having an ethylene content of greater than 55% and less than 62%, for example, may be used as the other rubber in combination with the two types of EPDMs, but at least one rubber selected from the group consisting of an IR, an SBR and a natural rubber is preferably used. The combinational use of any of these rubbers and the two types of EPDMs improves the friction coefficient μ of the sheet conveying roller. Particularly, the combinational use of the IR and the two types of EPDMs improves the abrasion resistance of the sheet conveying roller, and the combinational use of the SBR and the two types of EPDMs improves the hardness of the sheet conveying roller.

Usable examples of the IR include various polymers having a polyisoprene structure.

Specific examples of the IR include NIPOLE (registered trade name) series IR2200 and IR2200R available from Nippon Zeon Corporation, at least one which may be used.

Usable examples of the SBR include various copolymers prepared by copolymerizing styrene and butadiene by an emulsion polymerization method, a solution polymerization method or the like.

An oil-extension type SBR extended with an extension oil or a non-oil-extension type SBR not extended with an extension oil may be used as the SBR. In order to prevent the reduction in friction coefficient μ due to the bleeding of the extension oil, the SBR is preferably of the non-oil-extension type.

Specific examples of the non-oil-extension type SBR include NIPOLE (registered trade name) series 1500, 1502, NS116R, NS210, NS310S and NS616 available from Nippon Zeon Corporation, and EMULSION SBR1502 available from Sumitomo Chemical Co., Ltd., which may be used either alone or in combination.

The proportion of the other rubber for the rubber component is basically a balance obtained by subtracting the proportion of the higher ethylene content EPDM and the proportion of the lower ethylene content EPDM from the overall amount of the rubber component and, particularly preferably, not less than 30 mass % and not greater than 40 mass % based on the overall amount of the rubber component.

If the proportion of the other rubber for the rubber component is less than the aforementioned range, it will be impossible to sufficiently provide the effect of improving the friction coefficient $\mu$ of the sheet conveying roller by the blending of the other rubber.

If the proportion of the other rubber is greater than the aforementioned range, the proportions of the two types of EPDMs are relatively reduced, so that the sheet conveying roller is liable to be deteriorated in ozone resistance and weather resistance.

<Crosslinking Agent>

In the present invention, the peroxide crosslinking agent free from the blooming is used as the crosslinking agent.

Examples of the peroxide crosslinking agent include, but not byway of limitation, benzoyl peroxide, 1,1-bis(tert-butylperoxy)-3,3,5-trimethylcyclohexane, 2,5-dimethyl-2,5-di(benzoylperoxy)hexane, di(tert-butylperoxy)diisopropylbenzene, 1,4-bis[(tert-butyl)peroxyisopropyl]benzene, di(tert-butylperoxy)benzoate, tert-butylperoxybenzoate, dicumyl peroxide (DCP), tert-butyl cumyl peroxide, 2,5-dimethyl-2,5-di(tert-butylperoxy)hexane, di-tert-butyl peroxide and 2,5-dimethyl-2,5-di(tert-butylperoxy)-3-hexene, which may be used either alone or in combination.

The proportion of the peroxide crosslinking agent is preferably not less than 2 parts by mass and not greater than 4 parts by mass based on 100 parts by mass of the rubber component.

If the proportion of the peroxide crosslinking agent is less than the aforementioned range, the crosslinking is liable to be insufficient, thereby reducing the abrasion resistance of the sheet conveying roller.

If the proportion of the peroxide crosslinking agent is greater than the aforementioned range, the crosslinking is liable to excessively proceed, so that the sheet conveying roller fails to have a desired friction coefficient $\mu$ with an excessively high hardness.

<Crosslinking Assisting Agent>

In the present invention, a crosslinking assisting agent is preferably used in combination with the peroxide crosslinking agent.

Thus, a crosslinked product of the inventive rubber composition has a reduced permanent elongation. This further improves the effect of suppressing the time-related increase in the inner diameter of the through-hole of the sheet convening roller formed from the rubber composition to suppress the reduction in slip torque attributable to the increase in the inner diameter of the through-hole. It is also possible to increase the hardness of the sheet conveying roller.

Usable as the crosslinking assisting agent are various compounds which are capable of assisting the crosslinking of the rubber composition by the peroxide crosslinking agent.

Examples of the crosslinking assisting agent include, but not by way of limitation, triallyl isocyanurate (TAIC), sulfur, methacrylates, dibenzoylquinone dioxime and 1,2-polybutadiene, which may be used either alone or in combination.

The proportion of the crosslinking assisting agent is preferably not less than 1 part by mass and not greater than 3 parts by mass based on 100 parts by mass of the rubber component.

If the proportion of the crosslinking assisting agent is less than the aforementioned range, the effect of assisting the crosslinking of the rubber component by the combinational use of the crosslinking assisting agent and the crosslinking agent is liable to be insufficient, thereby reducing the abrasion resistance of the sheet conveying roller.

If the proportion of the crosslinking assisting agent is greater than the aforementioned range, the crosslinking assisting agent present in excess is liable to bloom on the outer surface of the sheet conveying roller, thereby reducing the friction coefficient $\mu$ of the sheet conveying roller.

<Other Components>

As required, various additives such as a filler, an oil and a plasticizer may be selectively blended in the rubber composition.

However, it is basically preferred that the oil and the plasticizer are not blended in the rubber composition because they are liable to bleed on the outer surface of the sheet conveying roller to reduce the friction coefficient $\mu$ of the sheet conveying roller.

Examples of the filler include carbon black, calcium carbonate, zinc oxide, silica, clay, talc, magnesium carbonate, aluminum hydroxide and titanium oxide, which may be used either alone or in combination.

The proportion of the filler is preferably not less than 10 parts by mass and not greater than 75 parts by mass based on 100 parts by mass of the rubber component.

If the proportion of the filler is less than the aforementioned range, it will be impossible to sufficiently provide the effect of reducing the permanent elongation of the sheet conveying roller by the blending of the filler to suppress the time-related increase in the inner diameter of the through-hole of the sheet conveying roller and the reduction in slip torque attributable to the increase in the inner diameter of the through-hole.

If the proportion of the filler is greater than the aforementioned range, on the other hand, the sheet conveying roller is liable to be deteriorated in abrasion resistance. Therefore, it is preferred to properly determine the proportion of the filler in consideration of the abrasion resistance of the sheet conveying roller.

Where two or more types of fillers are used in combination, the proportions of the respective fillers are controlled so that the total proportion of the fillers falls within the aforementioned range.

<Permanent Elongation>

It is preferred to properly adjust the types and combination of the aforementioned ingredients or the proportions of the respective ingredients so that the inventive rubber composition containing the ingredients provides a crosslinked product having a permanent elongation of not greater than 12%.

This further improves the effect of suppressing the time-related increase in the inner diameter of the through-hole of the sheet conveying roller formed from the rubber composition to suppress the reduction in slip torque attributable to the increase in the inner diameter of the through-hole.

If the permanent elongation is greater than the aforementioned range, the inner diameter of the through-hole of the sheet conveying roller is liable to increase with time during long-term storage, for example, to reduce the slip torque, thereby causing the rotative slippage of the shaft in the through-hole.

It is herein assumed, for example, that the inner diameter of the through-hole of the sheet conveying roller is 4.5 mm and the outer diameter of the shaft is 5 mm with an interference of 10%. If the permanent elongation is 20% (which is greater than 12%), the inner diameter is increased to 4.8 mm in a relatively short period of time to reduce the interference to 4%, thereby significantly reducing the slip torque.

If the permanent elongation is not greater than 12%, on the other hand, the inner diameter is merely changed to about 4.6 mm with time during relatively long-term storage to reduce the interference to about 8%. Thus, the reduction in slip torque is suppressed, thereby preventing the rotative slippage of the shaft in the sheet conveying roller.

The permanent elongation is preferably as small as possible, and is ideally 0%. Where the permanent elongation is not greater than 12%, it is possible to provide an effect comparable to that provided when the permanent elongation is 0%.

In the present invention, the permanent elongation is expressed as an elongation percentage measured at a temperature of 23° C. at a relative humidity of 55% by the constant elongation tension set test specified in the Japanese Industrial Standards JIS K6273:2006 "Rubber, vulcanized or thermoplastic—Determination of tension set, elongation and creep."

<<Sheet Conveying Roller>>

The FIGURE is a perspective view illustrating an exemplary sheet conveying roller according to one embodiment of the present invention.

Referring to the FIGURE, the exemplary sheet conveying roller 1 is produced by forming the inventive rubber composition into a tubular body and crosslinking the tubular body. The sheet conveying roller 1 has a center through-hole 2 having a round cross section. A cylindrical shaft 3 to be connected to a drive system not shown is inserted in and fixed to the through-hole 2. An outer surface 4 of the sheet conveying roller 1 to be brought into contact with a sheet has a cylindrical shape coaxial with the through-hole 2 and the shaft 3.

The shaft 3, which has an outer diameter greater than the inner diameter of the through-hole 2 of the sheet conveying roller 1, is press-inserted in the through-hole 2 of the sheet conveying roller 1, whereby the shaft 3 is fixed to the sheet conveying roller 1 so as not to rotatively slip in the through-hole 2.

A predetermined slip torque (a critical torque that prevents the rotative slippage) is provided between the sheet conveying roller and the shaft by an interference defined by a diameter difference between the through-hole of the sheet conveying roller and the shaft.

The shaft 3 is made of, for example, a metal, a ceramic material, a hard resin or the like.

The sheet conveying roller 1 is produced, for example, by forming the inventive rubber composition into a tubular body by an extrusion process or the like, and then crosslinking the tubular body by a press crosslinking process or the like.

As required, the outer surface 4 of the sheet conveying roller 1 may be polished to a predetermined surface roughness or subjected to a knurling process, a texturing process or the like in a given step of the production process.

Further, opposite end portions of the sheet conveying roller 1 may be cut so that the outer surface 4 of the sheet conveying roller 1 has a predetermined width.

The outer surface 4 of the sheet conveying roller 1 may be coated with a given coating layer. Further, the sheet conveying roller 1 may have a double layer structure including an outer layer adjacent to the outer surface 4 and an inner layer adjacent to the through-hole 2. In this case, at least the outer layer is preferably formed from the inventive rubber composition.

In order to simplify the construction for improvement of the productivity and the reduction of the production costs, the sheet conveying roller 1 preferably has a single layer structure as shown in the FIGURE. The sheet conveying roller 1 may have a porous structure, but preferably has a substantially non-porous structure so as to be less susceptible to the reduction in friction coefficient $\mu$ and imparted with a proper hardness, a smaller permanent elongation and an excellent abrasion resistance.

The through-hole 2 may be provided in eccentric relation to the center of the sheet conveying roller 1 depending on the use purpose of the sheet conveying roller 1. The outer surface 4 of the sheet conveying roller 1 is not necessarily required to be cylindrical, but may have an odd shape. For example, the outer surface 4 may have a partly cut-away planar portion.

The odd-shaped sheet conveying roller 1 may be produced by forming the inventive rubber composition directly into an odd-shaped body and then crosslinking the odd-shaped body by the aforementioned production method, or by post-processing the tubular sheet conveying roller 1 into an odd shape.

Alternatively, a shaft 3 having a shape conformable to the odd shape of the sheet conveying roller 1 may be press-inserted into the through-hole 2 of the tubular sheet conveying roller 1 to deform the sheet conveying roller 1 into the odd shape. In this case, the cylindrical outer surface 4 can be polished or subjected to the knurling process, the texturing process or the like before the deformation of the sheet conveying roller 1. This improves the processing efficiency.

<<Image Forming Apparatus>>

The inventive image forming apparatus incorporates the inventive sheet conveying roller. Examples of the image forming apparatus include various electrophotographic image forming apparatuses including laser printers, electrostatic copying machines, plain paper facsimile machines and printer-copier-facsimile machines.

Examples of the sheet conveying roller include sheet feed rollers, transport rollers, platen rollers and sheet output rollers which are rotatable in contact with a sheet to frictionally transport the sheet.

EXAMPLES

Example 1

Preparation of Rubber Composition

Used for a rubber component were 30 parts by mass of a higher ethylene content EPDM (NORDEL IP4770R (having an ethylene content of 70% and a diene content of 4.9%) available from the Dow Chemical Company), and 70 parts by mass of a lower ethylene content EPDM (ESPRENE 505A (having an ethylene content of 50% and a diene content of 9.5%) available from Sumitomo Chemical Co., Ltd.)

The proportion of the higher ethylene content EPDM was 30 mass % based on the overall amount of the rubber component.

Ingredients shown below in Table 1 were blended with and kneaded with the two types of EPDMs. Thus, a rubber composition was prepared.

TABLE 1

| Ingredients | Parts by mass |
| --- | --- |
| Carbon black | 30 |
| Heavy calcium carbonate | 30 |
| Peroxide crosslinking agent | 3 |
| Crosslinking assisting agent | 2 |

The ingredients shown in Table 1 are as follows: Carbon black: Filler HAF SEAST 3 (trade name) available from Tokai Carbon Co., Ltd.
Heavy calcium carbonate: Filler WHITEN (registered trade name) BF-300 available from Shiraishi Kogyo Kaisha, Ltd.
Peroxide crosslinking agent: Dicumyl peroxide (DCP) PER-CUMYL (registered trade name) D available from NOF Corporation)
Crosslinking assisting agent: Triallyl isocyanurate (TRIC) TAIC (registered trade name) available from Nippon Kasei Chemical Co., Ltd.

The amounts (parts by mass) of the respective ingredients shown in Table 1 are each based on 100 parts by mass of the rubber component.

(Production of Sheet Conveying Roller)

A tubular member (cot) was formed by extruding the rubber composition thus prepared into a tubular body and press-crosslinking the tubular body at 160° C. for 30 minutes. A shaft 3 having an outer diameter of 6 mm was press-inserted in and fixed to the through-hole 2 of the tubular member and, in this state, the outer surface 4 of the tubular member was polished to an outer diameter of 10 mm by means of a cylindrical grinder. Then, opposite end portions of the tubular member were cut, so that the tubular member had a width (axial length) of 10 mm. Thus, a sheet conveying roller 1 was produced. The through-hole 2 had an inner diameter of 5.4 mm, and an interference defined by a diameter difference between the through-hole 2 and the shaft 3 was 10%.

Example 2

A rubber composition was prepared in substantially the same manner as in Example 1, except that the amount of the higher ethylene content EPDM was 50 parts by mass and the amount of the lower ethylene content EPDM was 50 parts by mass. Then, a sheet conveying roller 1 was produced by using the rubber composition thus prepared.

The proportion of the higher ethylene content EPDM was 50 mass % based on the overall amount of the rubber component.

Example 3

A rubber composition was prepared in substantially the same manner as in Example 1, except that the amount of the higher ethylene content EPDM was 70 parts by mass and the amount of the lower ethylene content EPDM was 30 parts by mass. Then, a sheet conveying roller 1 was produced by using the rubber composition thus prepared.

The proportion of the higher ethylene content EPDM was 70 mass % based on the overall amount of the rubber component.

Example 4

A rubber composition was prepared in substantially the same manner as in Example 1, except that the amount of the higher ethylene content EPDM was 80 parts by mass and the amount of the lower ethylene content EPDM was 20 parts by mass. Then, a sheet conveying roller 1 was produced by using the rubber composition thus prepared.

The proportion of the higher ethylene content EPDM was 80 mass % based on the overall amount of the rubber component.

Comparative Example 1

A rubber composition was prepared in substantially the same manner as in Example 1, except that the amount of the higher ethylene content EPDM was 20 parts by mass and the amount of the lower ethylene content EPDM was 80 parts by mass. Then, a sheet conveying roller 1 was produced by using the rubber composition thus prepared.

The proportion of the higher ethylene content EPDM was 20 mass % based on the overall amount of the rubber component.

Comparative Example 2

A rubber composition was prepared in substantially the same manner as in Example 1, except that the amount of the higher ethylene content EPDM was 90 parts by mass and the amount of the lower ethylene content EPDM was 10 parts by mass. Then, a sheet conveying roller 1 was produced by using the rubber composition thus prepared.

The proportion of the higher ethylene content EPDM was 90 mass % based on the overall amount of the rubber component.

Example 5

A rubber composition was prepared in substantially the same manner as in Example 3, except that the triallyl isocyanurate crosslinking assisting agent was not blended. Then, a sheet conveying roller 1 was produced by using the rubber composition thus prepared.

The proportion of the higher ethylene content EPDM was 70 mass % based on the overall amount of the rubber component.

Example 6

A rubber composition was prepared in substantially the same manner as in Example 1, except that the rubber component contained 30 parts by mass of the higher ethylene content EPDM, 40 parts by mass of the lower ethylene content EPDM and 30 parts by mass of an IR (NIPOLE (registered trade name) IR2200 available from Nippon Zeon Corporation), and 20 parts by mass of carbon black and 40 parts by mass of heavy calcium carbonate were used as the filler. Then, a sheet conveying roller 1 was produced by using the rubber composition thus prepared.

The proportion of the higher ethylene content EPDM was 30 mass % based on the overall amount of the rubber component.

Example 7

A rubber composition was prepared in substantially the same manner as in Example 1, except that the rubber component contained 40 parts by mass of the higher ethylene content EPDM, 30 parts by mass of the lower ethylene content EPDM and 30 parts by mass of the IR. Then, a sheet conveying roller 1 was produced by using the rubber composition thus prepared.

The proportion of the higher ethylene content EPDM was 40 mass % based on the overall amount of the rubber component.

Example 8

A rubber composition was prepared in substantially the same manner as in Example 1, except that the rubber component contained 30 parts by mass of the higher ethylene content EPDM, 40 parts by mass of the lower ethylene content EPDM and 30 parts by mass of an SBR (EMULSION SBR1502 available from Sumitomo Chemical Co., Ltd.) Then, a sheet conveying roller 1 was produced by using the rubber composition thus prepared.

The proportion of the higher ethylene content EPDM was 30 mass % based on the overall amount of the rubber component.

<Hardness>

The Type-A Durometer hardness of each of the sheet conveying rollers 1 produced in Examples and Comparative Examples was measured at a temperature of 23° C. at a relative humidity of 55% by a measurement method specified in the Japanese Industrial Standards JIS K6253-3:2006 "Rubber, vulcanized or thermoplastic—Determination of hardness—Part 3: Durometer method."

A sheet conveying roller serving as a transport roller preferably has a Type-A Durometer hardness of not less than 50 degrees and not greater than 80 degrees. In Examples and Comparative Examples, a sheet conveying roller having a hardness falling within this range as measured by the aforementioned method is rated as acceptable (○), and a sheet conveying roller having a hardness falling outside this range is rated as unacceptable (x).

<Friction Coefficient $\mu$>

The friction coefficient $\mu$ of each of the sheet conveying rollers 1 produced in Examples and Comparative Examples was measured at a temperature of 23° C. at a relative humidity of 55% by means of a rotary friction coefficient measuring apparatus. The conditions for the measurement were a load of 200 g and a rotation speed of 120 rpm, and a XEROX (registered trade name) P sheet was used as a friction object.

A sheet conveying roller serving as a transport roller generally has a friction coefficient $\mu$ of not less than 0.7 and not greater than 1.0, but is lately required to have a higher friction coefficient. In Examples and Comparative Example, therefore, a sheet conveying roller having a friction coefficient $\mu$ of not less than 0.7 and not greater than 1.3 as measured by the aforementioned method is rated as acceptable (○), and a sheet conveying roller having a friction coefficient $\mu$ falling outside this range is rated as unacceptable (x).

<Permanent Elongation>

A test strip specified in the Japanese Industrial Standards JIS K6273:2006 "Rubber, vulcanized or thermoplastic—Determination of tension set, elongation and creep" was prepared by using each of the rubber compositions used for the production of the sheet conveying rollers in Examples and Comparative Examples, and the permanent elongation was measured as an elongation percentage at a temperature of 23° C. at a relative humidity of 55% by the constant elongation tension set test specified in JIS K6273:2006.

As described above, the permanent elongation is preferably not greater than 12%. In Examples and Comparative Examples, a rubber composition providing a test strip having a permanent elongation of not greater than 12% as measured by the aforementioned method is rated as acceptable (○), and a rubber composition providing a test strip having a permanent elongation of greater than 12% is rated as unacceptable (x).

<Abrasion Resistance>

The abrasion loss (mg) of each of the sheet conveying rollers 1 produced in Examples and Comparative Examples was measured at a temperature of 23° C. at a relative humidity of 55% by means of a rotary friction coefficient measuring apparatus, and the sheet conveying rollers 1 were each evaluated for the abrasion resistance based on the abrasion loss thus measured. The conditions for the measurement were a load of 500 g, a rotation speed of 200 rpm and a rotation period of 10 minutes, and a XEROX (registered trade name) P sheet was used as the friction object.

The smaller the abrasion loss, the more excellent the abrasion resistance. If the abrasion loss is 1.5 mg or greater, the sheet conveying roller is liable to cause a trouble in practice. In Examples and Comparative Examples, therefore, a sheet conveying roller having an abrasion loss of less than 1.5 mg is rated as acceptable (○), and a sheet conveying roller having an abrasion loss not less than 1.5 mg is rated as unacceptable (x).

The results are shown in Tables 2 and 3.

TABLE 2

| | Comparative Example 1 | Example 1 | Example 2 | Example 3 | Example 4 | Comparative Example 2 |
|---|---|---|---|---|---|---|
| | Parts by mass | | | | | |
| Higher ethylene content EPDM | 20 | 30 | 50 | 70 | 80 | 90 |
| Lower ethylene content EPDM | 80 | 70 | 50 | 30 | 20 | 10 |
| IR | — | — | — | — | — | — |
| SBR | — | — | — | — | — | — |
| Carbon black | 30 | 30 | 30 | 30 | 30 | 30 |
| Heavy calcium carbonate | 30 | 30 | 30 | 30 | 30 | 30 |
| Peroxide crosslinking agent | 3 | 3 | 3 | 3 | 3 | 3 |
| Crosslinking assisting agent | 2 | 2 | 2 | 2 | 2 | 2 |

TABLE 2-continued

|  |  | Comparative Example 1 | Example 1 | Example 2 | Example 3 | Example 4 | Comparative Example 2 |
|---|---|---|---|---|---|---|---|
|  |  | Results |  |  |  |  |  |
| Hardness | Measurement value (°) | 60 | 65 | 73 | 77 | 79 | 80 |
|  | Evaluation | ○ | ○ | ○ | ○ | ○ | ○ |
| Friction coefficient μ | Measurement value | 1.1 | 0.95 | 0.9 | 0.9 | 0.95 | 1.0 |
|  | Evaluation | ○ | ○ | ○ | ○ | ○ | ○ |
| Permanent elongation | Measurement value (%) | 3.5 | 5.4 | 8.2 | 10.8 | 12 | 25 |
|  | Evaluation | ○ | ○ | ○ | ○ | ○ | x |
| Abrasion resistance | Measurement value (mg) | 1.5 | 1.3 | 0.8 | 0.5 | 0.45 | 0.4 |
|  | Evaluation | x | ○ | ○ | ○ | ○ | ○ |

TABLE 3

|  |  | Example 5 | Example 6 | Example 7 | Example 8 |
|---|---|---|---|---|---|
| Parts by mass |  |  |  |  |  |
| Higher ethylene content EPDM |  | 70 | 30 | 40 | 30 |
| Lower ethylene content EPDM |  | 30 | 40 | 30 | 40 |
| IR |  | — | 30 | 30 | — |
| SBR |  | — | — | — | 30 |
| Carbon black |  | 30 | 20 | 30 | 30 |
| Heavy calcium carbonate |  | 30 | 40 | 30 | 30 |
| Peroxide crosslinking agent |  | 3 | 3 | 3 | 3 |
| Crosslinking assisting agent |  | — | 2 | 2 | 2 |
| Results |  |  |  |  |  |
| Hardness | Measurement value (°) | 76 | 65 | 67 | 70 |
|  | Evaluation | ○ | ○ | ○ | ○ |
| Friction coefficient μ | Measurement value | 0.9 | 1.1 | 1.1 | 1.3 |
|  | Evaluation | ○ | ○ | ○ | ○ |
| Permanent elongation | Measurement value (%) | 12 | 8.7 | 9.4 | 6.3 |
|  | Evaluation | ○ | ○ | ○ | ○ |
| Abrasion resistance | Measurement value (mg) | 0.7 | 0.7 | 0.6 | 1.4 |
|  | Evaluation | ○ | ○ | ○ | ○ |

The results for Examples 1 to 8 and Comparative Examples 1 and 2 shown in Tables 2 and 3 indicate that, where at least the higher ethylene content EPDM and the lower ethylene content EPDM are used in combination as the rubber component and the proportion of the higher ethylene content EPDM is not less than 30 mass % and not greater than 80 mass % based on the overall amount of the rubber component, the sheet conveying roller can be provided which is less susceptible to the reduction in friction coefficient μ and has a proper hardness, a smaller permanent elongation and an excellent abrasion resistance.

The results for Examples 1 to 4 indicate that the proportion of the higher ethylene content EPDM is preferably not less than 40 mass % and not greater than 70 mass % based on the overall amount of the rubber component for further improvement of the desired effects.

The results for Examples 3 and 5 indicate that the crosslinking assisting agent is preferably used in combination with the peroxide crosslinking agent to reduce the permanent elongation.

The results for Examples 1, 6 and 7 indicate that, where the IR is additionally used for the rubber component, it is possible to improve the abrasion resistance as well as the friction coefficient.

The results for Examples 1 and 8 indicate that, where the SBR is additionally used for the rubber component, it is possible to improve the hardness as well as the friction coefficient.

This application corresponds to Japanese Patent Application No. 2013-073094 filed in the Japan Patent Office on Mar. 29, 2013, the disclosure of which is incorporated herein by reference in its entirety.

What is claimed is:

1. A rubber composition for forming a sheet conveying roller, comprising a rubber component, and a peroxide crosslinking agent,
   wherein the rubber component consists of:
   a first portion of an ethylene propylene diene rubber having an ethylene content of not less than 62%; and
   a second portion of an ethylene propylene diene rubber having an ethylene content of not greater than 55%,
   wherein the first portion of the ethylene propylene diene rubber is present in a proportion of not less than 30 mass % and not greater than 50 mass % based on an overall amount of the rubber component.

2. The rubber composition according to claim 1, further comprising a crosslinking assisting agent.

3. The rubber composition according to claim 2, which provides a crosslinked product having a permanent elongation of not greater than 12%.

4. The rubber composition according to claim 1, which provides a crosslinked product having a permanent elongation of not greater than 12%.

5. A sheet conveying roller comprising a rubber composition according to claim 1.

6. An image forming apparatus comprising a sheet conveying roller according to claim 5.

* * * * *